May 26, 1959  A. HOLMBERG  2,888,284
LOCKING DEVICE
Filed March 28, 1955

Inventor
Arne Holmberg

United States Patent Office 2,888,284
Patented May 26, 1959

2,888,284

LOCKING DEVICE

Arne Holmberg, Saltsjo-Bo, Sweden

Application March 28, 1955, Serial No. 497,325

4 Claims. (Cl. 287—58)

This invention relates to a securing device for securing two elements together in a substantially automatic manner for the purpose of preventing relative longitudinal movement of the members in at least one direction.

Object of the invention is to provide a reliable but yet simple device of the kind indicated.

The above and other desirable objects inherent in and encompassed by the invention are elucidated in the ensuing specification, the appended claims, and the annexed drawing, wherein:

Figure 1:
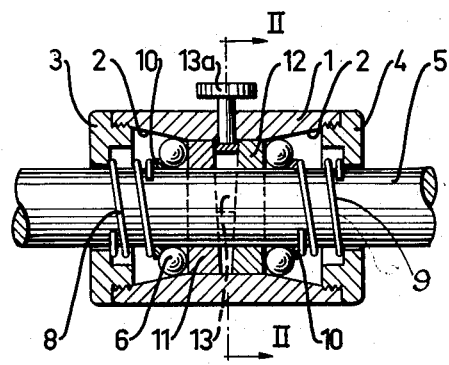
Fig. 1 is a longitudinal vertical sectional view of one embodiment.
Figure 2:
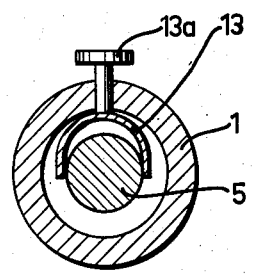
Fig. 2 is a transverse vertical section view taken on the line II—II of Fig. 1.

The device shown in Figs. 1 and 2 comprises an outer member in the shape of a cylindrical casing 1 having at each end a tapered bore 2 and being closed at each end by closure members 3 and 4. A rod 5 extends axially through the casing 1 and said closure members 4 and 5. At each end of the casing a number of freely disposed balls 6 are arranged to wedge between the exterior of the rod 5 and the interior wall of the tapered bore 2 of the casing 1 so as to securely retain the rod 5 and the casing 1 locked against relative movement. Springs 8 and 9 are interposed between the closure members 3 and 4, respectively, and washers 10 which abut against the balls 6. Said springs 8 and 9 are arranged to exert a resilient springing action in a manner to maintain the balls 6 in said wedging engagement with the casing 1 and the rod 5. Axially slidable releasing members 11 and 12 are arranged to circumferentially embrace the rod and engage the balls 6. Each releasing member 11, 12 is provided with a cam surface at its end remote from the balls 6. Between the releasing members 11, 12 there is interposed a cam-type releasing wedge 13 which, as is evident from Fig. 2, has the shape of a fork partly embracing the rod 5 and is provided with a releasing knob 13a. The releasing wedge 13 is arranged to exert by lateral displacement thereof a releasing wedging action against the releasing members 11, 12 at two diametrically opposed areas thereof so as to displace said releasing members and therewith the balls 6 in order to permit relative longitudinal movement of the casing 1 and the rod 5 in either direction.

Figure 3:
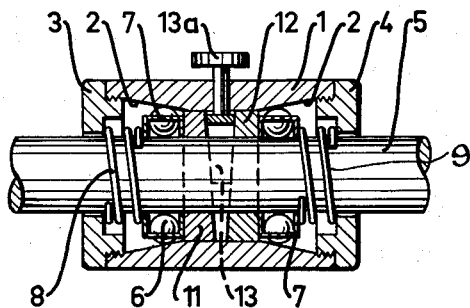
Fig. 3 is a longitudinal vertical sectional view of a second embodiment.

In the embodiment in Fig. 3 the same basic principles have been used and this embodiment departs from the embodiment in Figs. 1 and 2 only in that ball cages 7 have been provided for the balls 6.

While the invention has been described and illustrated in two preferred embodiments it should be understood that the invention is not to be limited to the precise details herein illustrated and described since the same may be carried out in other ways falling within the scope of the invention as claimed.

I claim:

1. In a securing device for securing two elements together in a substantially automatic manner for the purpose of preventing relative longitudinal movement of the members in at least one direction, the combination with inner and outer relatively movable members, said outer member having a tapered bore, a number of balls disposed in a ball cage and arranged to wedge between the exterior of said inner member and the interior wall of the tapered bore of the outer member in a manner to securely retain the inner and outer members locked against relative movement in said one direction, spring means interposed between an abutment portion of said outer member and one side of said ball cage and arranged to exert a resilient springing action in a manner to maintain said balls in said wedging engagement with said inner and outer members, an axially slidable releasing member circumferentially embracing said inner member and in engagement with the other side of said ball cage, said releasing member having a cam surface at its end remote from said ball cage, a cam-type releasing wedge interposed between said releasing member and an abutment-providing means in said outer member, said releasing wedge having the shape of a fork partly embracing said inner member and being arranged to exert by lateral displacement thereof a releasing wedging action against said releasing member at two diametrically opposed areas thereof so as to displace said releasing member and therewith said ball cage in order to permit relative longitudinal movement of said inner and outer members in either direction.

2. In a securing device for securing two elements together in a substantially automatic manner for the purpose of preventing relative longitudinal movement of the members, said outer member having at one end thereof a first tapered bore, a first set of balls disposed in a first ball cage and arranged to wedge between the exterior of said inner member and the wall of said first tapered bore of the outer member in a manner to securely retain the inner and outer members locked against relative movement in one direction, first spring means interposed between a first abutment portion of said outer member and one side of said first ball cage arranged to exert a resilient springing action in a manner to maintain said first set of balls in said wedging engagement with said inner and outer members, a first axially slidable releasing member circumferentially embracing said inner member and in engagement with the other side of said first ball cage, said outer member having at the other end thereof a second tapered bore, a second set of balls disposed in a second ball cage and arranged to wedge between the exterior of said inner member and the wall of said second tapered bore of the outer member in a manner to securely retain the inner and outer members locked against relative movement in the other direction of relative longitudinal movement, a second spring means interposed between a second abutment portion of said outer member and one side of said second ball cage arranged to exert a resilient springing action in a manner to maintain said second set of balls in said wedging engagement with said inner and outer members, a second axially slidable releasing member circumferentially embracing said inner member and in engagement with the other side of said second ball cage, each of said first and second releasing members having a cam surface at its end remote from the ball cage in engagement therewith, said cam surfaces sloping in opposite directions, a cam-type releasing wedge interposed between said first and second releasing members, said releasing wedge having the shape of a fork partly embracing said inner member and being arranged to exert by lateral displacement thereof a releasing wedging action against said first and second releasing members at two diametrically opposed areas of either one so as to spread said releasing members and said first and second ball cages in a direction apart from each other in order to permit relative longitudinal movement of said inner and outer members in either direction.

3. In a securing device for securing two elements together in a substantially automatic manner for the purpose of preventing relative longitudinal movement of the members in at least one direction, the combination with inner and outer relatively movable members, said outer member having a tapered bore, a number of freely disposed balls in the space between the exterior of said inner member and the interior wall of the tapered bore of the outer member and arranged to wedge therein in a manner to securely retain the inner and outer members locked against relative movement in said one direction, spring means interposed between an abutment portion of said outer member and said balls and arranged to exert a resilient springing action in a manner to maintain said balls in said wedging engagement with said inner and outer members, an axially slidable releasing member circumferentially embracing said inner member and in engagement with said balls, said releasing member having a cam surface at its end remote from said balls, a cam-type releasing wedge interposed between said releasing member and an abutment-providing means in said outer member, said releasing wedge having the shape of a fork partly embracing said inner member and being arranged to exert by lateral displacement thereof a releasing wedging action against said releasing member at two diametrically opposed areas thereof so as to displace said releasing member and therewith said balls in order to permit relative longitudinal movement of said inner and outer members in either direction.

4. In a securing device for securing two elements together in a substantially automatic manner for the purpose of preventing relative longitudinal movement of the members, said outer member having at one end thereof a first tapered bore, a first set of balls freely disposed in the space between the exterior of said inner member and the wall of said first tapered bore of the outer member and arranged to wedge in a manner to securely retain the inner and outer members locked against relative movement in one direction, first spring means interposed between a first abutment portion of said outer member and said set of balls arranged to exert a resilient springing action in a manner to maintain said first set of balls in said wedging engagement with said inner and outer members, a first axially slidable releasing member circumferentially embracing said inner member and in engagement with said balls, said outer member having at the other end thereof a second tapered bore, a second set of balls freely disposed in the space between the exterior of said inner member and the wall of said second tapered bore of the outer member and arranged to wedge in a manner to securely retain the inner and outer members locked against relative movement in the other direction of relative longitudinal movement, a second spring means interposed between a second abutment portion of said outer member and said balls arranged to exert a resilient spring action in a manner to maintain said second set of balls in said wedging engagement with said inner member and outer member, a second axially slidable releasing member circumferentially embracing said inner member and in engagement with the other side of said second set of balls, each of said first and second releasing members having a cam surface at its end remote from the balls, said cam surfaces sloping in opposite directions, a cam-type releasing wedge interposed between said first and second releasing members, said releasing wedge having the shape of a fork partly embracing said inner member and being arranged to exert by lateral displacement thereof a releasing wedging action against said first and second releasing members at two diametrically opposed areas of either one so as to spread said releasing members and said first and second sets of balls in a direction apart from each other in order to permit relative longitudinal movement of said inner and outer members in either direction.

References Cited in the file of this patent

UNITED STATES PATENTS

| | | |
|---|---|---|
| 546,380 | Colton | Sept. 17, 1895 |
| 581,136 | Preece | Apr. 20, 1897 |
| 934,929 | Morrison | Sept. 21, 1909 |
| 2,062,628 | Yannetta | Dec. 1, 1936 |
| 2,348,611 | Davidson | May 9, 1944 |
| 2,658,777 | Rauglas | Nov. 10, 1953 |

FOREIGN PATENTS

| | | |
|---|---|---|
| 538,266 | France | Mar. 16, 1922 |